C. HUSEMAN.
CONVERTIBLE CHILD'S WAGON, COASTER, AND SCOOTER.
APPLICATION FILED APR. 14, 1921.
1,395,497.
Patented Nov. 1, 1921.
2 SHEETS—SHEET 1.
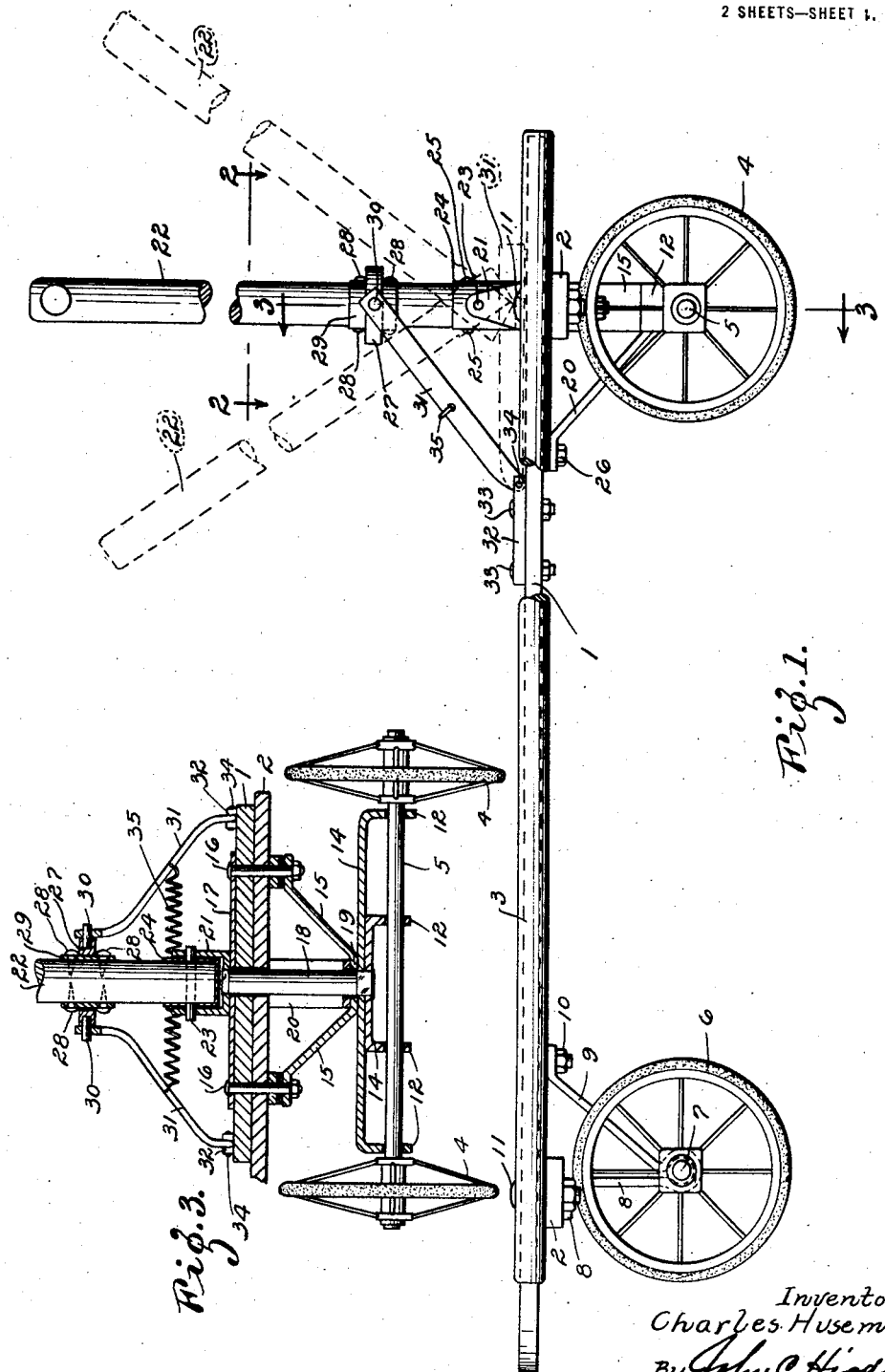
Inventor:
Charles Huseman.
By John C. Higdon
Attorney.

C. HUSEMAN.
CONVERTIBLE CHILD'S WAGON, COASTER, AND SCOOTER.
APPLICATION FILED APR. 14, 1921.
1,395,497.
Patented Nov. 1, 1921.
2 SHEETS—SHEET 2.
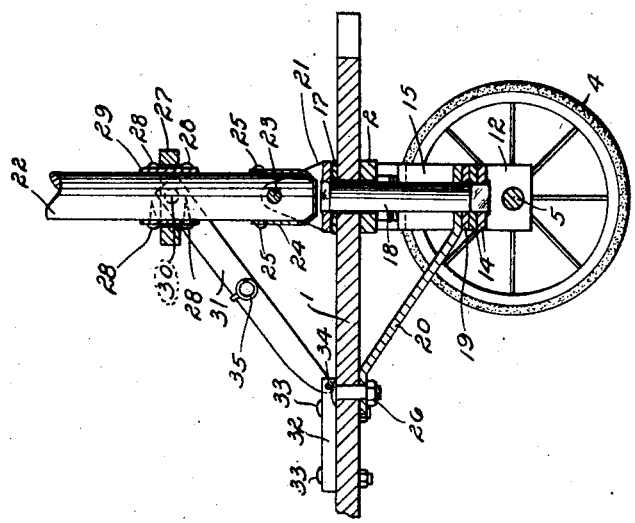
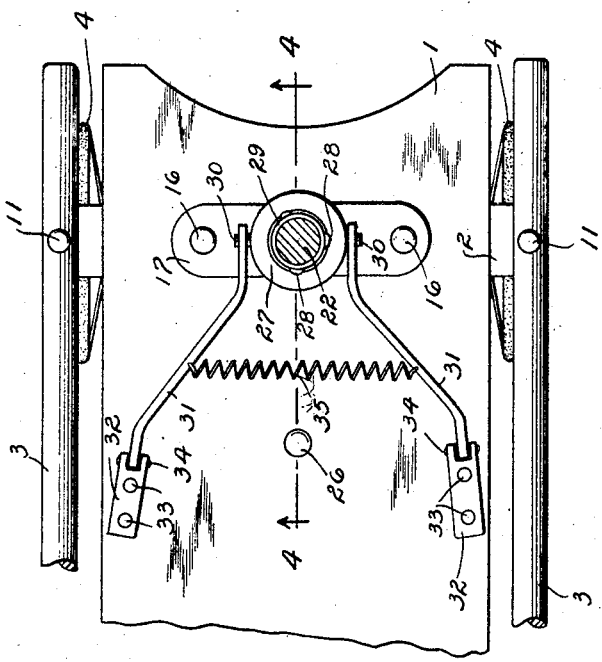
Inventor:
Charles Huseman
By John C. Higdon
Attorney.

UNITED STATES PATENT OFFICE.

CHARLES HUSEMAN, OF ST. LOUIS, MISSOURI.

CONVERTIBLE CHILD'S WAGON, COASTER, AND SCOOTER.

1,395,497.  Specification of Letters Patent.  Patented Nov. 1, 1921.

Application filed April 14, 1921. Serial No. 461,313.

*To all whom it may concern:*

Be it known that I, CHARLES HUSEMAN, a citizen of the United States, residing at St. Louis, in the State of Missouri, have invented certain new and useful Improvements in Convertible Children's Wagons, Coasters, and Scooters, of which the following is a specification containing a full, clear, and exact description, reference being had to the accompanying drawings, forming a part hereof.

My invention consists in the novel disclosure and combination of parts hereinafter particularly described and distinctly claimed.

The object of my invention is to provide an improved convertible child's wagon, which can be quickly and conveniently changed from a wagon that is to be drawn by a tongue, to a coasting-wagon which is steered by a person riding on the coaster, or to a scooter, in which the tongue stands vertical and is held in a vertical position by detachable braces, and is yet permitted a free rotary movement while in a vertical position; and which convertible device, as described, shall be of low cost, highly efficient, and strong and durable.

In the drawings,

Figure 1 is a side-elevation of my invention, with parts broken away, and having the tongue adjusted to a vertical position and temporarily held thereat by detachable braces, which do not interfere with the rotation of the tongue.

This figure shows the invention adjusted to form a scooter, the various possible backward and forward positions of the tongue being shown by dotted lines.

Fig. 2 is a fragmentary plan-view of the steering-end of the vehicle, partly in section, the section being taken on line 2—2 of Fig. 1.

Fig. 3 is a vertical section of the same, taken on the line 3—3 of Fig. 1, and

Fig. 4 is a sectioned side-elevation, taken on the line 4—4 of Fig. 2.

The numeral 1 designates the platform of the vehicle, mounted on the usual cross-bars or supports 2, and having grip-bars or holding-rods 3 extending parallel with its edges, in the present form of my invention.

In the present form of my invention I have shown the platform 1 carried upon four wheels, of which the front wheels 4 are arranged upon a swiveling front-axle 5, and the rear wheels 6 are mounted on a stationary axle 7; but it is to be understood that but a single steering-wheel can be used, thereby making the device a three-wheeled one, in the manner hereinafter described.

The rear wheels 6 have their axle 7 fixed or mounted at the lower ends of brackets 8 and braces 9 located beneath said platform, near the rear end of the latter, and secured thereto by bolts or screws 10.

Additional bolts 11 fasten the cross-bars 2 to the underside of said platform 1, and also secure the said holding-on rods 3 to said cross-bars.

The said swiveling front-axle 5 is carried by the down-turned arms 12 of swiveling-brackets 14, Fig. 3, upon which the front end of the device is supported, in a four-wheeled vehicle.

To provide a single central steering-wheel instead of the pair of steering-wheels, it will only be necessary to reduce the size of the single steering-wheel and mount it on the axle 5 in the space between said down-turned arms 12 of the smaller one of said brackets 14; but in such construction the said axle would be shortened, and the longer bracket 14 would be unnecessary, and could be omitted.

A platform bolster or bracket 15 is of V-shape, and is fixed to the underside of the front cross-bar 2 by means of bolts 16, which pass through apertures in said parts, and through apertures in a bearing-plate 17, Fig. 2, that is located on the upper surface of said platform at a point above the said bolster.

A steering king-bolt 18 has its lower end squared or non-circular, and fixed to the said swiveling brackets 14 at the center of the length of the latter, and extends vertically therefrom through an aperture or bearing formed in the center-bearing 19 of said bolster, thence through an aperture formed in a rearwardly-extending brace 20, Fig. 4, and thence through registering apertures formed in the front cross-bar 2, the platform 1, and the bearing-plate 17.

Fixed on the upper end of said steering king-bolt 18, and resting upon said bearing-plate 17, is a tongue-bracket 21 having perforated vertical ears between which the inner end of a tongue or handle 22 is pivotally mounted upon a bolt or rivet 23, the pivoted end of said handle being provided with a strengthening ring or thimble 24 secured in place by screws or nails 25.

Said brace 20 has its rear end fixed to the underside of the said platform 1 by means of a bolt 26.

A brace-ring 27 is loosely mounted upon the said tongue or handle 22, at a point a short distance above the pivoted lower end thereof, and is supported and prevented from longitudinal movement on said handle by the heads of screws 28 which also fasten a metallic bearing-thimble 29 on said handle, between the latter and said ring; so that the handle may turn freely in said ring.

Brace-pins 30 project from said ring 27 at diametrically opposite points of its periphery, so that the perforated forward ends of two handle-braces 31 may be detachably mounted upon said pins, when the device is to be used with the handle in a vertical position.

The rear ends of said handle-braces 31 are pivotally attached to the platform 1 by means of pivot-brackets 32, which are secured to the platform by means of bolts or rivets 33.

34 designates the pivots which connect the said braces to said brackets 32.

A coiled spring 35 has its ends fixed to the braces 31, at a point about midway of the length of the latter, and normally draws the front ends of said braces toward each other, and so retains the braces on said diametrically-opposite brace-pins 30 of said brace-ring 27, when the handle is adjusted to a vertical position.

*The operation.*

The operation and use of my invention will be readily apparent from the above description, so that it need only be added that when the vehicle is to be used as a wagon the handle-braces 31 are detached from the said brace-pins 30 of the brace-ring 27 carried by said handle, when it can be thrown forward to the position indicated by dotted lines in Fig. 1, or backward when the device is to be used as a coaster.

The said handle 22 is of course to be located in a vertical position when the device is in use as a scooter, in which position the handle is shown in the drawing.

I claim:—

1. A convertible wagon, coaster and scooter, composed of a platform, rear wheels for supporting the rear portion of said platform, a swiveling front-axle, rolling means on said axle, for supporting and steering the front portion of said platform; a steering king-bolt having its lower end connected to said swiveling front-axle and extending up through an aperture in the platform to a point above the latter; a tongue-bracket fixed on the upper end of said steering king-bolt; a tongue or handle having its end pivotally attached to said tongue-bracket; a ring mounted to permit said handle to rotate within it and having diametrically-opposite pins projecting from its outer periphery; and handle-braces pivotally-connected to said platform at their rear ends, and having perforated forward ends which may be mounted on said pins, or detached therefrom, as required to convert the device to the desired form of vehicle.

2. A convertible wagon, coaster and scooter, composed of a platform, rear wheels for supporting the rear portion of said platform, a swiveling front-axle, rolling means on said axle, for supporting and steering the front portion of said platform; a steering king-bolt having its lower end connected to said swiveling front-axle and extending up through an aperture in the platform to a point above the latter; a tongue-bracket fixed on the upper end of said steering king-bolt; a tongue or handle having its end pivotally attached to said tongue-bracket; a ring mounted to permit said handle to rotate within it and having diametrically-opposite pins projecting from its outer periphery; handle-braces pivotally-connected to said platform at their rear ends, and having perforated forward ends which may be mounted on said pins, or detached therefrom, as required to convert the device to the desired form of vehicle, and a spring applied to said handle-braces to yieldingly hold the perforated forward ends of said handle-braces in position on said pins of said ring.

3. The combination with the elements mentioned in the above claim 1, of two wheels as the said front-axle rolling-means.

In testimony whereof I have signed my name to this specification in presence of two subscribing witnesses.

CHARLES HUSEMAN.

Witnesses:
HENRY L. HIGDON,
JOHN C. HIGDON.